(12) United States Patent
Barone

(10) Patent No.: US 9,651,160 B2
(45) Date of Patent: May 16, 2017

(54) ANTI-FLUTTER CHECK VALVE

(71) Applicant: Hamilton Sundstrand Corporation, Windsor Locks, CT (US)

(72) Inventor: Michael R. Barone, Amston, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/495,287

(22) Filed: Sep. 24, 2014

(65) Prior Publication Data

US 2016/0084393 A1  Mar. 24, 2016

(51) Int. Cl.
*F16K 15/03* (2006.01)

(52) U.S. Cl.
CPC .......... *F16K 15/033* (2013.01); *F16K 15/038* (2013.01)

(58) Field of Classification Search
CPC .... F16K 15/03; F16K 15/08; Y10T 137/7898; Y10T 137/7839
USPC .............................................. 137/512.1, 527
See application file for complete search history.

(56) References Cited

U.S. PATENT DOCUMENTS

| 3,640,306 | A | * | 2/1972 | Vogt ...................... F16K 15/035 |
| | | | | 137/512.1 |
| 4,005,732 | A | | 2/1977 | Buckner |
| 4,196,745 | A | | 4/1980 | Schutzer |
| 4,249,567 | A | | 2/1981 | Weiss |
| 2012/0073277 | A1 | | 3/2012 | Gafforelli et al. |

FOREIGN PATENT DOCUMENTS

GB             11193           0/1910

OTHER PUBLICATIONS

Extended European Search Report, EP Application No. 15186680.3, dated Mar. 1, 2016, 8 pages.

* cited by examiner

*Primary Examiner* — Kevin Lee
*Assistant Examiner* — P. Macade Nichols
(74) *Attorney, Agent, or Firm* — Kinney & Lange, P.A.

(57) ABSTRACT

A check valve includes a housing, a hinge pin connected to the housing, and a flap with a cam surface having stability points, the flap rotatably connected to the hinge pin. The check valve further includes a stop pin connected to the housing, a spring mounted on the stop pin, the spring having an arm, and a detent element mounted on the arm of the spring. The spring urges the detent element to be in contact with the cam surface and the flap is stable when the detent element is located at one of the plurality of stability points.

19 Claims, 5 Drawing Sheets

ANTI-FLUTTER CHECK VALVE

BACKGROUND

The present disclosure relates to a check valve, and in particular, to an anti-flutter check valve for fluid management.

Check valves, such as those utilized in air management systems on aircraft, work automatically. One type of check valve includes a rotating member, such as a flap. When a threshold fluid velocity is reached, the flap begins to open. The flap includes ears with which the flap is mounted on a hinge pin, and a torsion spring is mounted on the hinge pin for flap closure. While the design of a check valve with a flap can be low weight and low cost, the flap is inherently unstable due to flutter. The closing torque on the spring increases proportionally with the opening angle of the flap while the projected area of the flap decreases. This results in the spring urging the flap to close, and results in oscillation, or flutter, of the flap between an open position and a closed position. Flutter can cause increased wear on the hinge pin or pulsations in an air management system that have adverse effects on the system's performance, including inconsistent flow and fluid velocity. Additionally, the torsion spring on the hinge pin typically has a limited length due to competing with the length of the flap ears on the hinge pin. The limited length limits the spring life, and flutter also limits the spring life due to continuous cyclic loading on the spring which can lead to spring failure. Moreover, flutter causes additional relative motion between the flap and the hinge pin resulting in detrimental wear on the pin, flap, or both.

SUMMARY

A check valve includes a housing, a hinge pin connected to the housing, and a flap with a cam surface having stability points, the flap rotatably connected to the hinge pin. The check valve further includes a stop pin connected to the housing, a spring mounted on the stop pin, the spring having an arm, and a detent element mounted on the arm of the spring. The spring urges the detent element to be in contact with the cam surface and the flap is stable when the detent element is located at one of the stability points.

An actuation mechanism includes a hinge pin, a flap with a cam surface having stability points, the flap rotatably connected to the hinge pin, a spring having an arm, and a detent element mounted on the arm of the spring. The spring urges the detent element to be in contact with the cam surface and the flap is stable when the detent element is located at one of the stability points.

DETAILED DESCRIPTION

The check valve of the present disclosure can be used in but is not limited to air management and environmental control systems, such as pressurization systems for vehicles. The check valve mitigates or eliminates instabilities that can cause valve flutter in check valves with rotating members. The check valve includes a flap with a cam surface. A spring used to close the valve is mounted on a stop pin instead of a hinge pin and includes a detent element mounted on the spring arm. The spring urges the detent element to be in contact with the cam surface of the flap. When the flap opens due to fluid force, the detent element follows the path of the cam surface and settles into stability points on the cam surface. The stability points significantly reduce oscillation of the flap between an open and a closed position, thus mitigating or eliminating flutter of the check valve.

Figure 1:
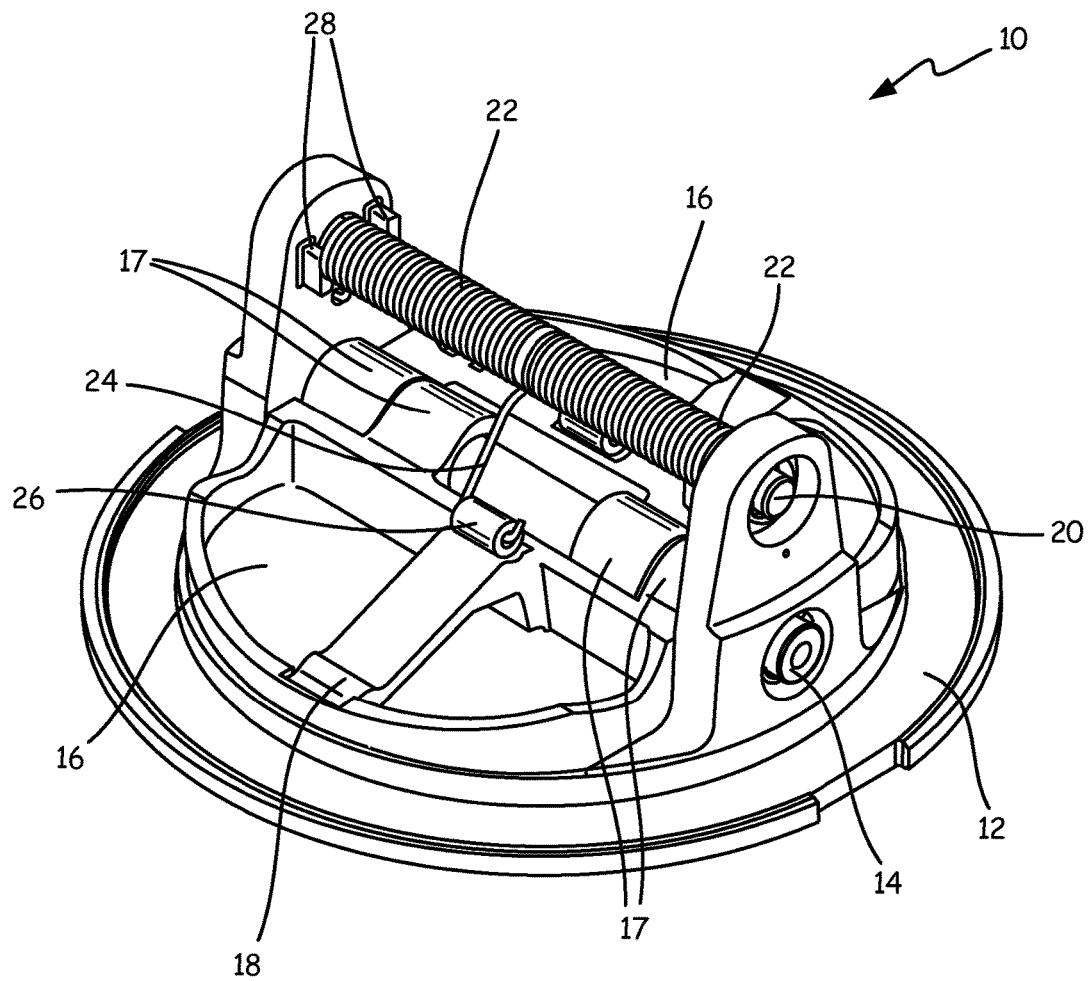
FIG. 1 is a perspective view of a check valve.

FIG. 1 is a perspective view of check valve 10. Check valve 10 includes housing 12, hinge pin 14, flaps 16 with ears 17 and cam surfaces 18, stop pin 20, springs 22 with arms 24 and detent elements 26, and stop bars 28. In the embodiment shown, check valve 10 includes two flaps 16. Each flap 16 includes ears 17 and cam surface 18. In the embodiment shown, check valve 10 also includes two springs 22. Each spring 22 includes arm 24 and detent element 26. Stop bars 28 are connected to housing 12 and are located on either side of each spring 22. In an alternative embodiment, check valve 10 functions in a substantially similar way and can include a single flap 16 with ears 17 and cam surface 18, as well as a single spring 22 with arm 24 and detent element 26. Check valve 10 will be discussed below with reference to a single flap 16 and a single spring 22.

Hinge pin 14 is connected to housing. Flap 16 is rotatably connected to hinge pin 14 with ears 17. In the embodiment shown, cam surface 18 is integral with flap 16. In an alternative embodiment, cam surface 18 can be a removable piece attached to flap 16. Cam surface 18 can be made of an alternate material, such as rubber or plastic, and can be attached to flap 16 with glue, a screw, or a rivet, for example. Stop pin 20 is attached to housing 12 above hinge pin 14. Spring 22 is attached to stop pin 20. Arm 24 extends from spring 22 and detent element 26 is mounted on arm 24. In the embodiment shown, detent element 26 is a roller. In alternate embodiments, detent element 26 can be a bearing or a low friction slider. Spring 22 urges detent element 26 to be in contact with cam surface 18. Stop bars 28 are located on housing 12 at both ends of stop pin 20 and spring 22.

As stated above, flap 16 is rotatably connected to hinge pin 14 with ears 17, and hinge pin 14 connects to housing 12. If spring 22 were also attached to hinge pin 14, the length of spring 22 would be severely limited by ears 17. This would result in severely decreased spring life of spring 22, which could require frequent replacement of spring 22. Attachment of spring 22 to stop pin 20 allows spring 22 to have a maximum possible length within the design constraints of check valve 10, which allows for increased spring life of spring 22. Attachment of spring 22 to stop pin 20 also allows for detent element 26 to be connected to arm 24 of spring 22. When check valve 10 moves between a closed position, partially open positions, and a fully opened position, detent element 26 travels along cam surface 18 of flap 16. The combination of detent element 26 and cam surface 18 can mitigate or eliminate flutter of check valve 10 (discussed in further detail with respect to FIGS. 3A-3D). Check valve 10 is therefore advantageous, as mitigation of flutter as well as increased length of spring 22 can significantly extend the life of spring 22 and check valve 10. The use of check valve 10 in air management systems can therefore drive down the life-cycle cost of check valves.

Figure 2A:
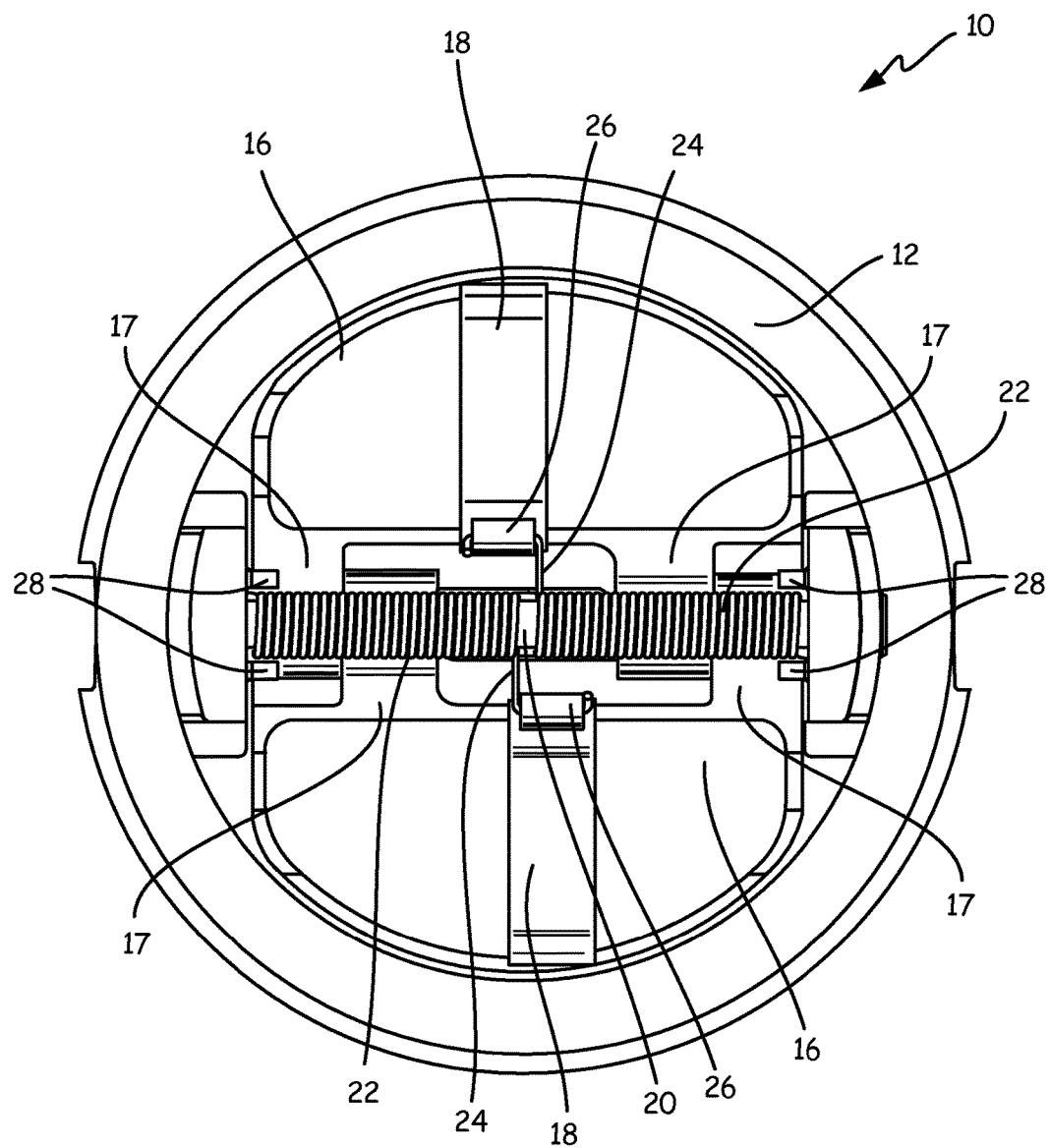
FIG. 2A is a top view of the check valve in a closed position.
Figure 2B:
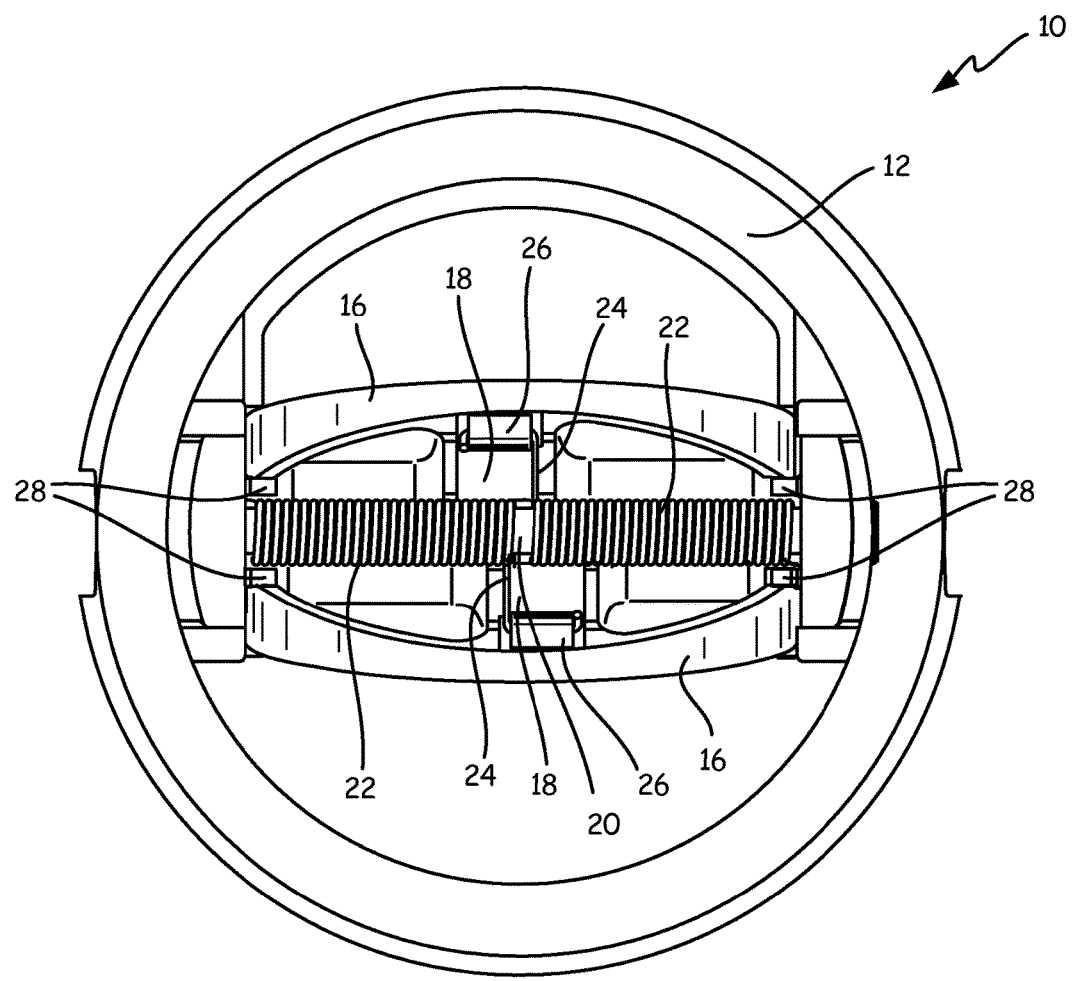
FIG. 2B is a top view of the check valve in an open position.

FIG. 2A is a top view of check valve 10 in a closed position. FIG. 2B is a top view of check valve 10 in a fully open position. Check valve 10 includes housing 12, hinge pin 14, flap 16 with ears 17 and cam surface 18, stop pin 20, spring 22 with arm 24 and detent element 26, and stop bars 28. Check valve 10 remains in a closed position, as shown in FIG. 2A until a fluid flowing into check valve 10 reaches a threshold velocity. When a threshold fluid velocity is reached, flap 16 begins to open, allowing fluid to pass through check valve 10. An increase in fluid velocity further opens flap 16 until flap 16 reaches a fully open position, as shown in FIG. 2B. Stop bars 28 are hard stops and are aligned on housing 12 such that when check valve 10 is in a fully open position, stop bars 28 prevent flap 16 from coming into contact with spring 22 and causing damage to spring 22. Stop bars 28 also allow spring 22 to fully utilize the length of stop pin 20, as stop bars 28 also prevent flap 16 from coming into contact with stop pin 20.

Figure 3A:
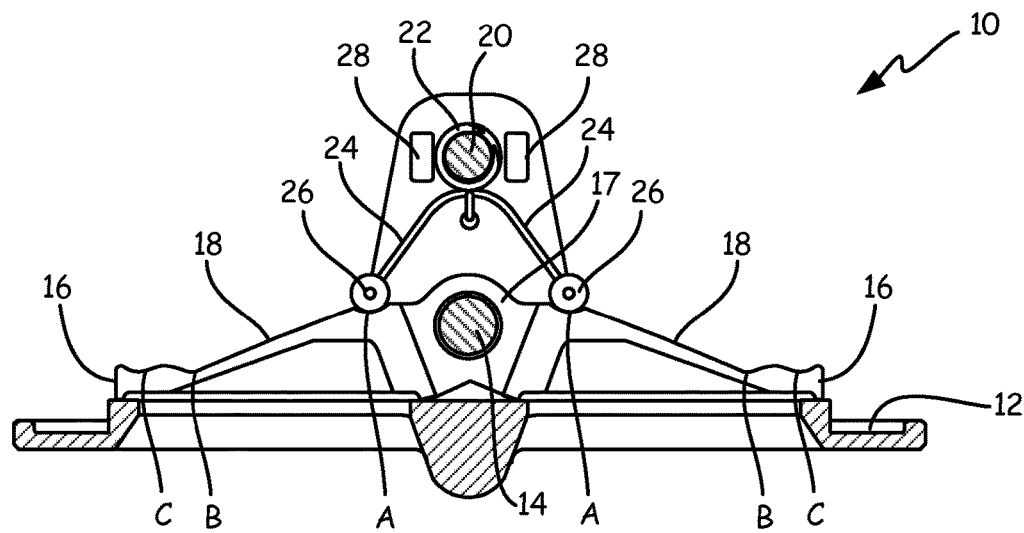
FIG. 3A is a side-sectional view of the check valve with the flaps positioned at 0 degrees.
Figure 3B:
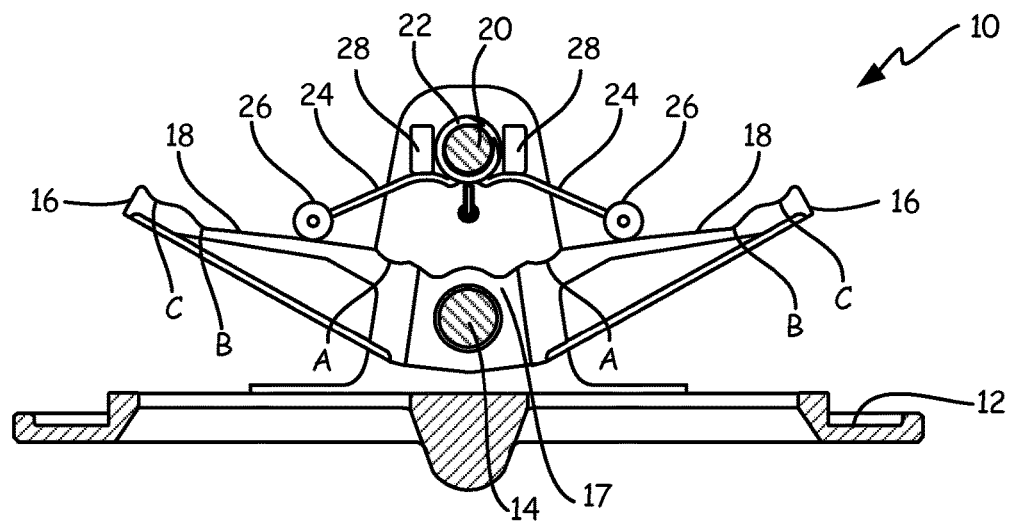
FIG. 3B is a side-sectional view of the check valve with the flaps positioned at 30 degrees.
Figure 3C:
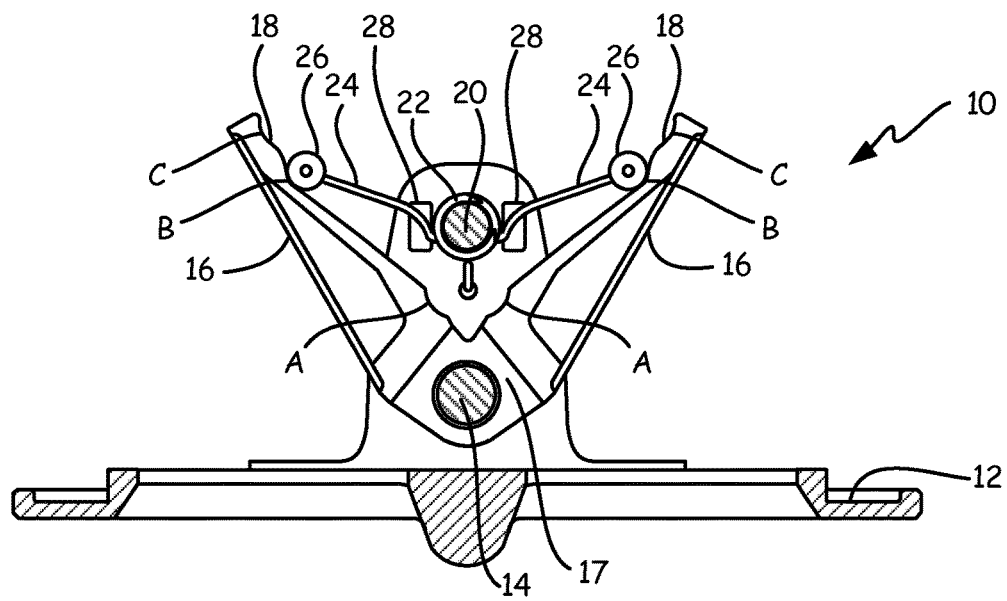
FIG. 3C is a side-sectional view of the check valve with the flaps positioned at 60 degrees.
Figure 3D:
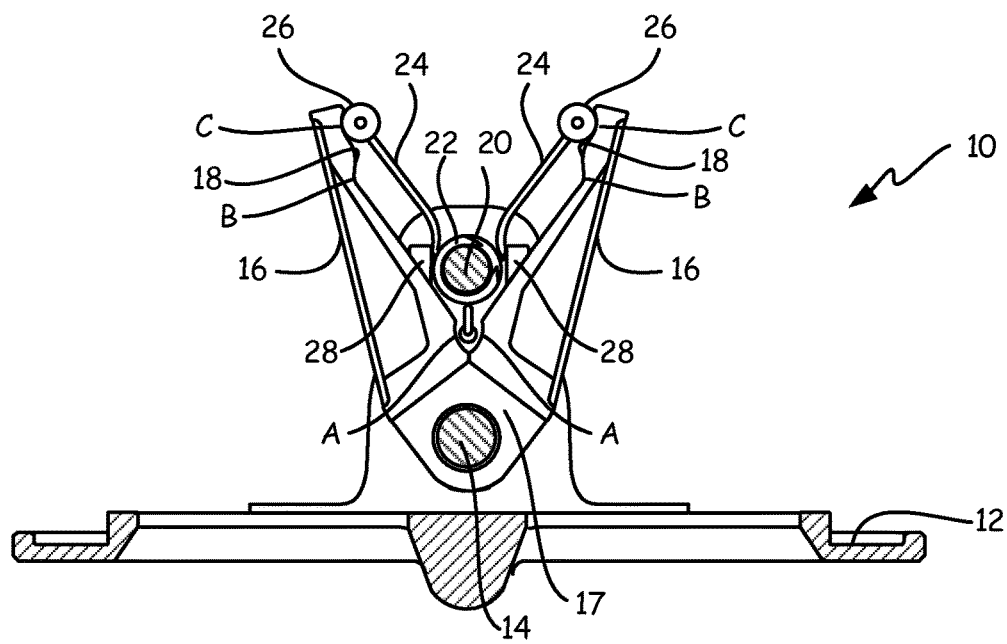
FIG. 3D is a side-sectional view of the check valve with the flaps positioned at 77 degrees.

FIG. 3A is a side-sectional view of check valve 10 with flap 16 positioned at 0 degrees, a closed position. FIG. 3B is a side-sectional view of check valve 10 with flap 16 positioned at 30 degrees, a partially open position. FIG. 3C is a side-sectional view of check valve 10 with flap 16 positioned at 60 degrees, a mostly open position. FIG. 3D is a side-sectional view of check valve 10 with flap 16 positioned at 77 degrees, a fully open position. Check valve 10 includes housing 12, hinge pin 14, flap 16 with ears 17 and cam surface 18, stop pin 20, spring 22 with arm 24 and detent element 26, and stop bars 28. Cam surface 18 includes stability points A, B, and C.

Stability points A, B, and C on cam surface 18 allow for mitigation of flutter in check valve 10. Spring 22 urges detent element 26 to be in contact with cam surface 18, providing a closing torque on flap 16. Stability points A, B, and C allow for variation in the closing torque of spring 22 on flap 16 along cam surface 18. When flap 16 is in a closed or checked position, 0 degrees shown in FIG. 3A, detent element 26 is positioned in stability point A. Spring 22 provides a resultant force that keeps detent element 26 in stability point A and keeps check valve 10 closed. The inclusion of stability point A on cam surface 18 is advantageous, as spring 22 urges flap 16 to remain closed until a threshold fluid velocity is reached. Without stability point A, flap 16 would experience small oscillations that cause small angle flutter when flap 16 is in a closed position. Stability point A mitigates small oscillations in flap 16 and therefore mitigates small angle flutter in check valve 10.

When a threshold fluid velocity is reached, detent element 26 is forced out of stability point A on cam surface 18 and flap 16 begins to open. Once detent element 26 is forced out of stability point A, the angle of flap 16 relative to the force that spring 22 provides on detent element 26 changes substantially, making it easier to open flap 16. This mitigates flutter, as flap 16 does not attempt to close due to an increasing closing torque on spring 22. Instead, spring 22 urges detent element 26 to continue sliding along cam surface 18. This further opens flap 16, as shown in FIG. 3B, where flap 16 is in a partially open position at 30 degrees.

Detent element 26 continues sliding along cam surface 18 until detent element 26 reaches stability point B where flap 16 is in a mostly open position at 60 degrees, as shown in FIG. 3C. Spring 22 provides a resultant force that keeps detent element 26 in stability point B, preventing large oscillations of flap 16 between a mostly open position and a closed position and therefore mitigates high-angle flutter.

When a high enough fluid velocity is reached, detent element 26 is forced out of stability point B on cam surface 18 and spring 22 urges detent element 26 to continue sliding along cam surface 18. Detent element 26 continues to slide along cam surface 18 until detent element 26 reaches stability point C, where flap 16 is in a fully open position at 77 degrees, as shown in FIG. 3D. Spring 22 provides a resultant force that keeps detent element 26 in stability point C, preventing large oscillations of flap 16 between a fully open position and a closed position and therefore mitigates highest-angle flutter.

In the embodiment shown in FIGS. 3A-3D, check valve 10 is advantageous, because it provides three stable positions for flap 16. The stable positions mitigate flutter and prevent wear on spring 22, extending the life of check valve 10 and minimizing adverse effects on the performance of an air management system, including inconsistent flow and fluid velocity. In alternative embodiments, cam surface 18 can include any number of stability points and therefore any number of stable positions for flap 16.

Discussion of Possible Embodiments

The following are non-exclusive descriptions of possible embodiments of the present invention.

A check valve, according to an exemplary embodiment of this disclosure, among other possible things, includes a housing, a hinge pin connected to the housing, and a flap with a cam surface having stability points, the flap rotatably connected to the hinge pin. The check valve further includes a stop pin connected to the housing, a spring mounted on the stop pin, the spring having an arm, and a detent element mounted on the arm of the spring. The spring urges the detent element to be in contact with the cam surface and the flap is stable when the detent element is located at one of the stability points.

The check valve of the preceding paragraph can optionally include, additionally and/or alternatively, any one or more of the following features, configurations and/or additional components:

A further embodiment of the foregoing check valve, wherein the cam surface is removable from the flap.

A further embodiment of any of the foregoing check valves, wherein the cam surface comprises rubber or plastic.

A further embodiment of any of the foregoing check valves, wherein the cam surface attaches to the flap with glue, a screw, or a rivet.

A further embodiment of any of the foregoing check valves, wherein the detent element is a roller, a bearing, or a low friction slider.

A further embodiment of any of the foregoing check valves, wherein the stability points include a first stability point and a second stability point.

A further embodiment of any of the foregoing check valves, wherein the first stability point is configured such that the flap is stable at 0 degrees and the second stability point is configured such that the flap is stable at 77 degrees.

A further embodiment of any of the foregoing check valves, wherein the stability points further include a third stability point.

A further embodiment of any of the foregoing check valves, wherein the third stability point is configured such that the flap is stable at 60 degrees.

A further embodiment of any of the foregoing check valves, and further including stop bars adjacent to the stop pin, the stop bars configured to be in contact with the flap when the flap is in a fully open position.

A further embodiment of any of the foregoing check valves, and further including a second flap with a second cam surface having stability points, the second flap rotatably connected to the hinge pin, a second spring mounted on the stop pin, the second spring having a second arm, and a second detent element mounted on the second arm of the second spring. The second spring urges the second detent element to be in contact with the second cam surface, and the second flap is stable when the second detent element is located at one of the stability points.

An actuation mechanism, according to an exemplary embodiment of this disclosure, among other possible things, includes a hinge pin, a flap with a cam surface having stability points, the flap rotatably connected to the hinge pin, a spring having an arm, and a detent element mounted on the arm of the spring. The spring urges the detent element to be in contact with the cam surface and the flap is stable when the detent element is located at one of the stability points.

The actuation mechanism of the preceding paragraph can optionally include, additionally and/or alternatively, any one or more of the following features, configurations and/or additional components:

A further embodiment of the foregoing actuation mechanism, wherein the stability points include a first stability point, a second stability point, and a third stability point.

A further embodiment of any of the foregoing actuation mechanisms, wherein the first stability point is configured such that the flap is stable at 0 degrees, the second stability point is configured such that the flap is stable at 60 degrees, and the third stability point is configured such that the flap is stable at 77 degrees.

A further embodiment of any of the foregoing actuation mechanisms, and further including a second flap with a second cam surface having stability points, the second flap rotatably connected to the hinge pin, a second spring mounted on the stop pin, the second spring having a second arm, and a second detent element mounted on the second arm of the second spring. The second spring urges the second detent element to be in contact with the second cam surface, and the second flap is stable when the second detent element is located at one of the stability points.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A check valve comprising:
   a housing;
   a hinge pin connected to the housing;
   a flap with a cam surface having a plurality of stability points, the flap rotatably connected to the hinge pin;
   a stop pin connected to the housing;
   a spring mounted on the stop pin, the spring having an arm;
   a detent element mounted on the arm of the spring, wherein the spring urges the detent element to be in contact with the cam surface and wherein the flap is stable when the detent element is located at one of the plurality of stability points; and
   a plurality of stop bars adjacent to the stop pin, the plurality of stop bars configured to be in contact with the flap when the flap is in a fully open position.

2. The check valve of claim 1, wherein the cam surface is removable from the flap.

3. The check valve of claim 2, wherein the cam surface comprises rubber or plastic.

4. The check valve of claim 3, wherein the cam surface attaches to the flap with glue, a screw, or a rivet.

5. The check valve of claim 1, wherein the detent element comprises a roller, a bearing, or a low friction slider.

6. The check valve of claim 1, wherein the plurality of stability points comprises a first stability point and a second stability point.

7. The check valve of claim 6, wherein the first stability point is configured such that the flap is stable at 0 degrees and the second stability point is configured such that the flap is stable at 77 degrees.

8. The check valve of claim 7, wherein the plurality of stability points further comprises a third stability point.

9. The check valve of claim 8, wherein the third stability point is configured such that the flap is stable at 60 degrees.

10. The check valve of claim 1, and further comprising:
    a second flap with a second cam surface having a second plurality of stability points, the second flap rotatably connected to the hinge pin;
    a second spring mounted on the stop pin, the second spring having a second arm; and
    a second detent element mounted on the second arm of the second spring, wherein the second spring urges the second detent element to be in contact with the second cam surface and wherein the second flap is stable when the second detent element is located at one of the second plurality of stability points.

11. An actuation mechanism comprising:
    a hinge pin;
    a flap with a cam surface having a plurality of stability points, the flap rotatably connected to the hinge pin;
    a spring having an arm, wherein the spring is mounted on a pin that is spaced from and parallel to the hinge pin;
    a detent element mounted on the arm of the spring, wherein the spring urges the detent element to be in contact with the cam surface and wherein the flap is stable when the detent element is located at one of the plurality of stability points; and
    a plurality of stop bars adjacent to the pin that is spaced from and parallel to the hinge pin, the plurality of stop bars configured to be in contact with the flap when the flap is in a fully open position.

12. The actuation mechanism of claim 11, wherein the plurality of stability points comprises a first stability point, a second stability point, and a third stability point.

13. The actuation mechanism of claim 12, wherein the first stability point is configured such that the flap is stable at 0 degrees, the second stability point is configured such that the flap is stable at 60 degrees, and the third stability point is configured such that the flap is stable at 77 degrees.

14. The actuation mechanism of claim 11, and further comprising:
    a second flap with a second cam surface having a second plurality of stability points, the second flap rotatably connected to the hinge pin;
    a second spring having a second arm; and
    a second detent element mounted on the second arm of the second spring, wherein the second spring urges the second detent element to be in contact with the second cam surface and wherein the second flap is stable when the second detent element is located at one of the second plurality of stability points.

15. An actuation mechanism comprising:
a hinge pin;
a first flap with a first cam surface having a first plurality of stability points, the flap rotatably connected to the hinge pin;
a first spring having an arm;
a first detent element mounted on the arm of the first spring, wherein the first spring urges the first detent element to be in contact with the first cam surface and wherein the first flap is stable when the first detent element is located at one of the first plurality of stability points;
a second flap with a second cam surface having a second plurality of stability points, the second flap rotatably connected to the hinge pin;
a second spring having a second arm; and
a second detent element mounted on the second arm of the second spring, wherein the second spring urges the second detent element to be in contact with the second cam surface and wherein the second flap is stable when the second detent element is located at one of the second plurality of stability points.

16. The actuation mechanism of claim 15, wherein each of the first and second plurality of stability points comprises a first stability point, a second stability point, and a third stability point.

17. The actuation mechanism of claim 16, wherein the first stability points are configured such that the first and second flaps are stable at 0 degrees, the second stability points are configured such that the first and second flaps are stable at 60 degrees, and the third stability points are configured such that the first and second flaps are stable at 77 degrees.

18. A check valve comprising:
a housing;
a hinge pin connected to the housing;
a flap with a cam surface having a plurality of stability points, the flap rotatably connected to the hinge pin, wherein the cam surface is removable from the flap;
a stop pin connected to the housing;
a spring mounted on the stop pin, the spring having an arm; and
a detent element mounted on the arm of the spring, wherein the spring urges the detent element to be in contact with the cam surface and wherein the flap is stable when the detent element is located at one of the plurality of stability points.

19. A check valve comprising:
a housing;
a hinge pin connected to the housing;
a flap with a cam surface having a plurality of stability points, the flap rotatably connected to the hinge pin;
a stop pin connected to the housing;
a spring mounted on the stop pin, the spring having an arm; and
a detent element mounted on the arm of the spring, wherein the spring urges the detent element to be in contact with the cam surface and wherein the flap is stable when the detent element is located at one of the plurality of stability points and wherein the detent element comprises a roller, a bearing, or a low friction slider.

* * * * *